UNITED STATES PATENT OFFICE 2,294,571

METHOD AND MATERIAL FOR TREATING METAL SURFACES

Theron P. Remy, Los Angeles, Calif.

No Drawing. Application August 4, 1940,
Serial No. 351,434

11 Claims. (Cl. 148—6.5)

This invention relates to improvements in the art of treating iron or steel articles or articles having a coating of iron or steel for the purpose of cleaning the surfaces of rust and preventing the oxidation or rusting thereof. Further, this invention relates to the provision of such a treatment of ferrous surfaces preparatory to painting by the production of a molecular film bonded thereto so that oxidation does not take place.

The use of phosphoric acid and phosphate coatings for the purpose of rust-proofing has been known in the art. However, none of the teachings provide for the rapid treatment of articles inasmuch as most of them require a substantial period of time to accomplish the desired reaction for the result. This, while it may not be long measured by the time in the individual instance, makes the use of such materials in large quantities and on large surfaces practically uneconomical. Likewise, the materials in use in some instances require heating. This adds another element of cost and a further obstacle to practical adoption. Where both time and heat factors have been eliminated the cost of material has formerly made the use prohibitive. It has therefore been among the objects of the present invention to supply a formulation and a method of treatment which eliminated the present difficulties in a satisfactory manner.

Iron and steel have substantially no porosity for the assimilation of moisture or for paint bonding. Further, any ferrous surface attempts to convert to its basic earthly form, the oxides (rust) because of its inherent electrical makeup. For this reason corrosion prevention becomes an economic problem of vast proportions.

Since iron and steel have a tendency to dissolve in water—microchemical amounts as well as water or moisture apparent visually or by touch—containing dissolved oxygen, to prevent the surface from rusting it is necessary to exclude oxygen in combination with moisture of any type. Paint coatings are rarely moisture proof, thus if the penetration reaches the ferrous surface the action of rusting takes place. The penetration of the painted surface by some form of water or moisture (with oxygen) does not necessarily mean that the paint is dissolved by the water and oxygen, but essentially that the paint does not provide an absolutely impervious surface to them. The effect is increased by water containing salts, such as sea water, industrial atmospheres carrying sulfurous vapors and the like.

Corrosion broadly covers all reactions of metals and their alloys. Corrosion products resulting from the mutual interactions of the several ions are present in any given case. The rusting of ferrous surfaces is a type of corrosion which requires moisture and dissolved oxygen under most circumstances. Lack of complete homogeneity in metal surfaces as to physical and chemical structure based on micro-analysis permits a potential variable in the presence of moisture or other corrosive media. The potential variable is either anodic or cathodic, depending upon the absorption or release of electrons. A feeble flow of electric current is thus set up.

The tendency of iron or steel to rust or corrode in any given solution is determined by its tendency to enter the solution at the anode and to plate out hydrogen at the cathode as measured by the overall effective potential.

Moisture penetrating as a minute percentage on iron=

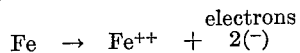

that is, iron exhibits its solution tendency to give off ferrous ion liberating electrons.

The water as pure water, is in equilibrium with its ions and is neutral.

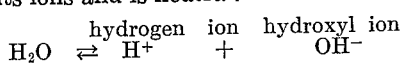

The electrons generated by the solution tension of iron have sufficient potential to discharge the hydrogen ion (H+) from the water as hydrogen, $2H^+ + 2(-) \rightarrow H_2$ (gas or dissolved) thus leaving the hydroxyl ion in excess, giving an alkaline reaction and iron hydroxide formation. The presence of dissolved oxygen will enable the dissolved hydrogen to be removed as water with the net result of metallic iron changed to iron hydroxide, which is oxidized by dissolved oxygen from $Fe(OH)_2$ to

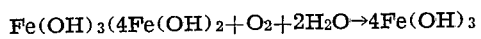

which latter is precipitated as iron rust,

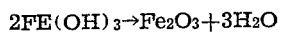

Phosphooric acid has long been known in the art of rustproofing. This material in and of itself reacts with iron to form ferrous phosphate, which when painted over the surface does not completely prevent the rusting when moisture enters through a paint film.

It has been found that the addition of titanium tetrachloride will materially aid the control and prevention of iron corrosion when used in a phosphooric acid medium so modified as to carry it. The means employed to obtain this novel result is by the suspension of the titanium tetrachloride in fluid form through the use of small amounts of hydrogen peroxide in a solution of water and alcohols.

In has been found that relatively small amounts of the titanium tetrachloride are required to plate out a thin film of the metal or its complex salts on ferrous surfaces. As little as 16ths of 1% by volume is sufficient to accomplish this purpose.

An example of the formulation of the solution which has been found to be satisfactory in practice is as follows:

| | Cubic centimeters |
|---|---|
| Phosphoric acid | 1400 |
| Water | 1500 |
| Ethyl alcohol | 750 |
| Butyl alcohol | 190 |
| Hydrogen peroxide | 75 |
| Titanium tetrachloride | 40 |

Titanium tetrachloride undergoes a series of reactions which are beneficial in aiding the deposition of a film of rust resisting salts. When iron or any ferrous surface is dipped or coated with the liquid the titanium tetrachloride oxidizes the hydrogen formed, in part. This action is supplemented by a union also with the hydroxyl ions to form orthotitanic acid. In this way two significant and desirable reactions are brought about, first, a rapid reaction through oxidation of hydrogen, and second, reduction of the tendency for alkalinity which is the basis for iron hydroxide and subsequent oxide formation in increasing ratio as the OH (hydroxyl) ions are available. The probable explanation for this reaction lies in the coordination theory of Werner. In addition to the above reaction small amounts of titanium phosphate are formed with the breakdown of the stabilizing hydrogen peroxide.

It will be seen that the present invention takes into consideration the hydroxyl ion in the complex rust and corroding reactions which has been heretofore entirely ignored.

The methods of using the formation on a ferrous surface either for cleaning or for pre-paint treatment are substantially the same. The formulation can be applied to the surfaces either by dipping, spraying or brushing. While the surface is still wet it is washed by hosing, spraying, wet cloths or the like. The rust and dissolved waste is thus cleaned from the surface. At the same time an electro-negative film of chemical salts is plated out which does not wash off. The coating so produced is such that moisture reaching it is brought to ionic balance, thus preventing corrosion which only occurs in the instances referred to herein when the plus and negative charges are out of balance.

It will be seen that in the present invention the formulation aids the paint film as a pre-paint treatment by the etching of the phosphoric acid on the ferrous surface, producing a film over the surface which permits the paint or lacquer to adhere better, and also by the elimination of the hydroxyl ions which are extremely injurious to paint film.

The film so deposited if left uncovered by a primer or paint coating will in time (short compared with the life of good paint), wear out as it is exposed to constant electronic phenomena in large amounts when left in the open air. Therefore, the use of a good primer and an over coating of paint or lacquer is desirable to prevent excessive drain of the electro-negative film.

The formulation given herein is by way of example and illustration only and the invention in its broader aspects is not limited to the particular substances or proportions which are preferred in this instance. Instead of titanium any suitable chloride of a metallic member of the carbon group may be employed.

I claim:

1. A rust preventing composition consisting of weak acids for attacking oxides with a minimal attack on the metal body containing titanium tetrachloride in solution.

2. A rust preventing composition containing a phosphoric acid medium modified to carry titanium tetrachloride in solution.

3. A rust preventing composition containing a phosphoric acid medium and the suspension of titanium tetrachloride in fluid form by means of small amounts of hydrogen peroxide in a solution of water and alcohols.

4. A bath for rust proofing ferrous surfaces comprising a solution of phosphoric acid carrying a small amount of titanium tetrachloride.

5. The process of treating iron or steel, or articles composed of or having a surface of iron or steel, which process comprises subjecting said article or articles to a bath made up of a solution of phosphoric acid carrying a small amount of titanium tetrachloride in solution.

6. The process of treating iron or steel, or articles composed of or having a surface of iron or steel, which process comprises applying on said article or articles a coating made up of a solution of phosphoric acid carrying a small amount of titanium tetrachloride in solution.

7. The treatment of iron or steel which consists in subjecting the surfaces to a solution of a phosphoric acid medium modified to carry titanium tetrachloride in suspension.

8. The treatment of iron or steel which consists in subjecting the surfaces to a solution of a phosphoric acid medium containing titanium tetrachloride in fluid form through the use of hydrogen peroxide in a solution of water and alcohols.

9. The treatment of iron or steel which consists in subjecting the surfaces to a solution of a phosphoric acid medium containing titanium tetrachloride in fluid form through the use of hydrogen peroxide in a solution of water and alcohols and washing the same with water while still wet.

10. A rust resisting coating for iron or steel, or articles composed of or having a surface of iron or steel, said coating containing an electro-negative plating of titanium and its complex salts.

11. A rust resisting coating for iron or steel, or articles composed of or having a surface of iron or steel, said coating containing an electro-negative plating of a metallic member of the carbon group and its complex salts.

THERON P. REMY.